United States Patent
Komanduru et al.

(10) Patent No.: US 12,270,919 B1
(45) Date of Patent: Apr. 8, 2025

(54) METHOD AND APPARATUS FOR NAVIGATION USING A REDUCED NUMBER OF TRANSMITTERS

(71) Applicant: Government of the United States of America as represented by the Secretary of the Air Force, Kirtland AFB, NM (US)

(72) Inventors: Abi Komanduru, Okemos, MI (US); Madeleine Naudeau, Albuquerque, NM (US)

(73) Assignee: United States of America as represented by the Secretary of the Air Force, Kirtland AFB, NM (US)

( * ) Notice: Subject to any disclaimer, the term of this patent is extended or adjusted under 35 U.S.C. 154(b) by 235 days.

(21) Appl. No.: 17/842,505

(22) Filed: Jun. 16, 2022

Related U.S. Application Data

(60) Division of application No. 16/375,249, filed on Apr. 4, 2019, now Pat. No. 11,487,021, which is a continuation-in-part of application No. 16/137,325, filed on Sep. 20, 2018, now abandoned.

(51) Int. Cl.
*G01S 19/45* (2010.01)
*G01S 11/08* (2006.01)

(52) U.S. Cl.
CPC .............. *G01S 19/45* (2013.01); *G01S 11/08* (2013.01)

(58) Field of Classification Search
CPC .................................. G01S 19/45; G01S 11/08
See application file for complete search history.

(56) References Cited

U.S. PATENT DOCUMENTS

| | | | | |
|---|---|---|---|---|
| 6,526,352 B1* | 2/2003 | Breed | ................. | G01S 19/48 701/470 |
| 6,611,755 B1* | 8/2003 | Coffee | ................. | B28C 9/00 455/526 |
| 10,620,296 B1* | 4/2020 | Ezal | ................. | G01S 1/14 |
| 2012/0086606 A1* | 4/2012 | Mathews | ................. | G01S 11/10 342/461 |
| 2015/0042511 A1* | 2/2015 | Miller | ................. | G01S 19/29 342/357.51 |
| 2017/0357303 A1* | 12/2017 | Kopetz | ................. | H04J 3/0638 |
| 2019/0025437 A1* | 1/2019 | Derbez | ................. | G01S 19/21 |

* cited by examiner

*Primary Examiner* — Bernarr E Gregory
(74) *Attorney, Agent, or Firm* — AFNWC/JA; David L. Narciso

(57) ABSTRACT

A system for determining a position of a receiver from as few as two or three transmitters. The receiver may be stationary or moving with a known velocity. The system includes a receiver clock having a clock bias and a clock drift relative to a reference clock and may also include a motion sensor. A decoder receives transmitted signals from a number of transmitters and determine pseudo-ranges and transmitter frequencies therefrom and a processing unit receives the pseudo-ranges, the transmitter frequencies and the receiver velocity and determines the position of the receiver therefrom. When only two transmitters are available, the position of the receiver is determined dependent upon a known receiver clock drift. The system may also determine clock bias and, when three or more transmitters are available, receiver clock drift. The processing unit uses ranging and Doppler equations in combination, and may also use a measured velocity.

12 Claims, 5 Drawing Sheets

METHOD AND APPARATUS FOR NAVIGATION USING A REDUCED NUMBER OF TRANSMITTERS

This application is a divisional application of U.S. patent application Ser. No. 16/375,249 filed on Apr. 4, 2019, now U.S. Pat. No. 11,487,021, which was a continuation-in-part of then-pending patent application Ser. No. 16/137,325 filed on Sep. 20, 2018, entitled "Method and Apparatus for Navigation Using a Reduced Numbers of Transmitters, now abandoned."

STATEMENT OF GOVERNMENT INTEREST

The invention described herein may be manufactured, used, and licensed by or for the Government of the United States for all governmental purposes without the payment of any royalty.

RELATED APPLICATION

This application is a divisional application of co-pending U.S. patent application Ser. No. 16/375,249 filed on Apr. 4, 2019, which was a continuation-in-part of then pending patent application Ser. No. 16/137,325 filed on Sep. 20, 2018 entitled "Method and Apparatus for Navigation Using a Reduced Numbers of Transmitters." The disclosure of each of these applications from which priority is claimed is hereby incorporated herein by reference in its entirety.

BACKGROUND

FIG. 1 is a diagrammatic representation of a system 100 for determining position, velocity and time (PVT) of a navigation receiver 102. Prior systems, such as a Global Positioning System, require at least four transmitters when position and time of the receiver are unknown. The transmitters are shown in this example as orbital satellites 104, 106 and 108 and aircraft transmitter 110. While other types of transmitters may be used, such as towers or ground vehicles, the minimum number of transmitters is four. Existing transmitter-based techniques require at least four transmitters when there are four unknown values to be determined, namely three position coordinates and a clock bias between the user clock and the system clock of the transmitters.

Alternatively, position and velocity may be estimated using an inertial navigation system. However, an inertial navigation system integrates sensor signals over time and their accuracy is limited due to the integration of noise in the signals, which may cause drift in an estimate of position and/or velocity. Also, these approaches require an initial estimate of position.

An inertial sensor-based system may be used to provide redundancy for a satellite-based system so as to provide substantially continuous navigation when fewer than four transmitters are available.

However, there exists a need in the art for a navigation receiver that can calculate position when fewer than four transmitters are available and is not subject to drift in the estimated position. The reduced number of transmitter signals may be due to positioning of the transmitter relative to the earth, physical obstruction by a natural feature such as a mountain, incomplete transmitter deployment, transmitter failure, or other reasons.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
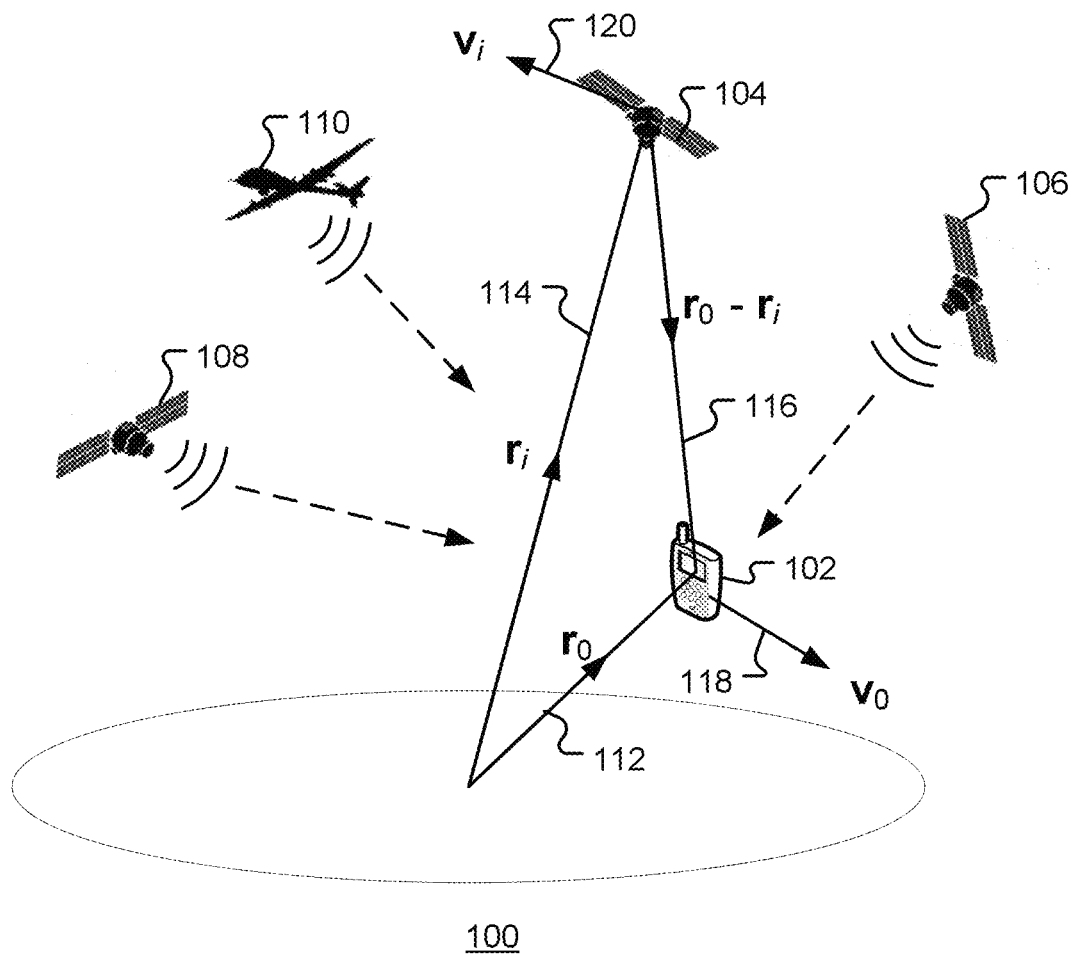
FIG. 1 is a perspective view of a navigation receiver utilizing a number of transmitter signals.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially" or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text. In general, the devices, systems, and methods described herein may include a navigational system capable of operation with fewer than four transmitters.

An embodiment of the invention, as shown and described by the various figures and accompanying text, provides a navigation receiver capable of calculating position, velocity, and time (PVT) using signals from fewer than four transmitters.

In one arrangement, a system is provided for determining a position of a receiver. The system includes a receiver clock that provides a receiver time having a clock bias and a clock drift relative to a reference clock, a decoder that receives transmitted signals from a plurality of transmitters and determines a plurality of pseudo-range and a plurality of transmitter frequencies therefrom, where the determined pseudo range and transmitter frequencies are dependent upon the receiver time. The system also includes a processing unit that receives the plurality of pseudo-ranges, the plurality of transmitter frequencies and determines the position of the receiver therefrom. The processor may determine the position of the receiver dependent upon known locations and velocities of the plurality of transmitters. When only three transmitters are available, the position of the receiver is determined dependent upon a known receiver velocity, whereas, when only two transmitters are available and receiver clock drift is known, the position of the receiver is determined dependent upon the known receiver velocity and the known receiver clock drift.

The system may be used when the receiver is stationary or moving with a known velocity. The velocity may be measured by combining the outputs of a speed sensor and a direction sensor.

Various receiver clock clocks may be used, such as a chip-scale atomic clock, a temperature compensated crystal oscillator, or an oven controlled crystal oscillator.

Various processors may be used, such as a hardware graphics processing unit, a hardware vector processor or a field programmable gate array.

In one arrangement, a smoothing filter is provided to receive the determined receiver position and clock bias and produce a smoothed receiver position and a smoothed clock bias therefrom.

As will be discussed in more detail below, the location of the receiver may be determined from signals received from the transmitters. For example, for each of three transmitters, a measured pseudo-range from the receiver to the transmitter is received. The measured pseudo-range, a position of the transmitter, and the velocity of the receiver, which are known, are related to the position of the receiver and a clock bias of a receiver clock, which are unknown, through a first relationship. For each of at least two transmitters of the three transmitters, a measured frequency of a signal transmitted from the transmitter is received. The measured frequency, the position of the transmitter, the velocity of the transmitter, the velocity of the receiver and the measured pseudo-range, which are known, are related to the position of the receiver, the clock bias, and a clock drift of the receiver clock, which are unknown, through a second relationship. The position of the receiver is determined from the first relationships for the three transmitters and second relationships for the at least two transmitters.

The method may be implemented in software by executing processing instructions on one or more processors. The instructions may be stored on a non-transient, computer readable medium, for example.

The receiver clock may be used to generate a timing signal from oscillations of a crystal or a chip-scale atomic clock. For each of the three transmitters, the measured pseudo-range is determined dependent upon the timing signal, a time encoded in a signal transmitted from the transmitter and a propagation model. Whereas, for each of the at least two transmitters, the measured frequency is determined dependent upon the time signaling.

One or more of the transmitters may be moving relative to the receiver. Accuracy may be improved when two or more transmitters are moving relative to the receiver. For example, the location of the receiver having a known velocity may be determined from two transmitters that are moving relative to the receiver. For each of the two transmitters, a measured pseudo-range from the receiver to the transmitter is received, where the measured pseudo-range, a position of the transmitter, the velocity of the receiver, which are known, are related to the position of the receiver and a clock bias of a receiver clock, which are unknown, through a first relationship. Also, a measured frequency of a signal transmitted from the transmitter is received, where the measured frequency, the position of the transmitter, the velocity of the transmitter, the velocity of the receiver, a clock drift of the receiver clock and the measured pseudo-range, which are known, are related to the position of the receiver, the clock bias, and, which are unknown, through a second relationship. The position of the receiver is determined from the first relationships and the second relationships. As before, the location may be determined in dedicated hardware processor or in a processor that executes processing instructions. The processing instructions may be stored on a non-transient, computer readable medium, for example.

FIG. 1 is a diagrammatic representation of a system 100 for determining position, velocity and time (PVT) of a navigation receiver 102. Prior systems require at least four transmitters, shown in this example as orbital satellites 104, 106 and 108 and aircraft transmitter 110. While other types of transmitters may be used, such as towers or ground vehicles, the minimum number of transmitters is four. Existing systems require at least four transmitters to determine the four unknown values, namely the three position coordinates and a clock error.

One embodiment of the disclosure provides a receiver architecture and computation configuration that can estimate a position value and a time value using ranging signals from moving transmitters. The receiver can operate using any suitable system of transmitters of ranging signals, including Global Navigation Satellite Systems (GNSS) and pseudolite (pseudo-satellite) systems, provided that at least two of the transmitters are moving. The receiver is capable of determining position and time estimates using fewer than the four transmitters required by GNSS receivers. For a receiver with known velocity, estimates of the position and time can be made with a minimum of three transmitters. This technique enhances GNSS receiver hardware designs. The solution generated could be used as the final solution or it could be used as the initial, or intermediate position and clock drift estimates that seed iterative solution techniques that utilize more transmitters.

In the description below $r_0$, shown as vector 112 in FIG. 1, is a position of receiver 102, $r_i$, shown as vector 114, is a position of the $i^{th}$ receiver 104, and $r_0-r_i$, shown as vector 116 in FIG. 1, is a vector from transmitter i to the receiver 102.

Receiver 102 is assumed to be moving with velocity $v_0$, shown as vector 118 and transmitter i (104) is assumed to be moving with velocity $v_i$, shown as vector 120.

Figure 2:
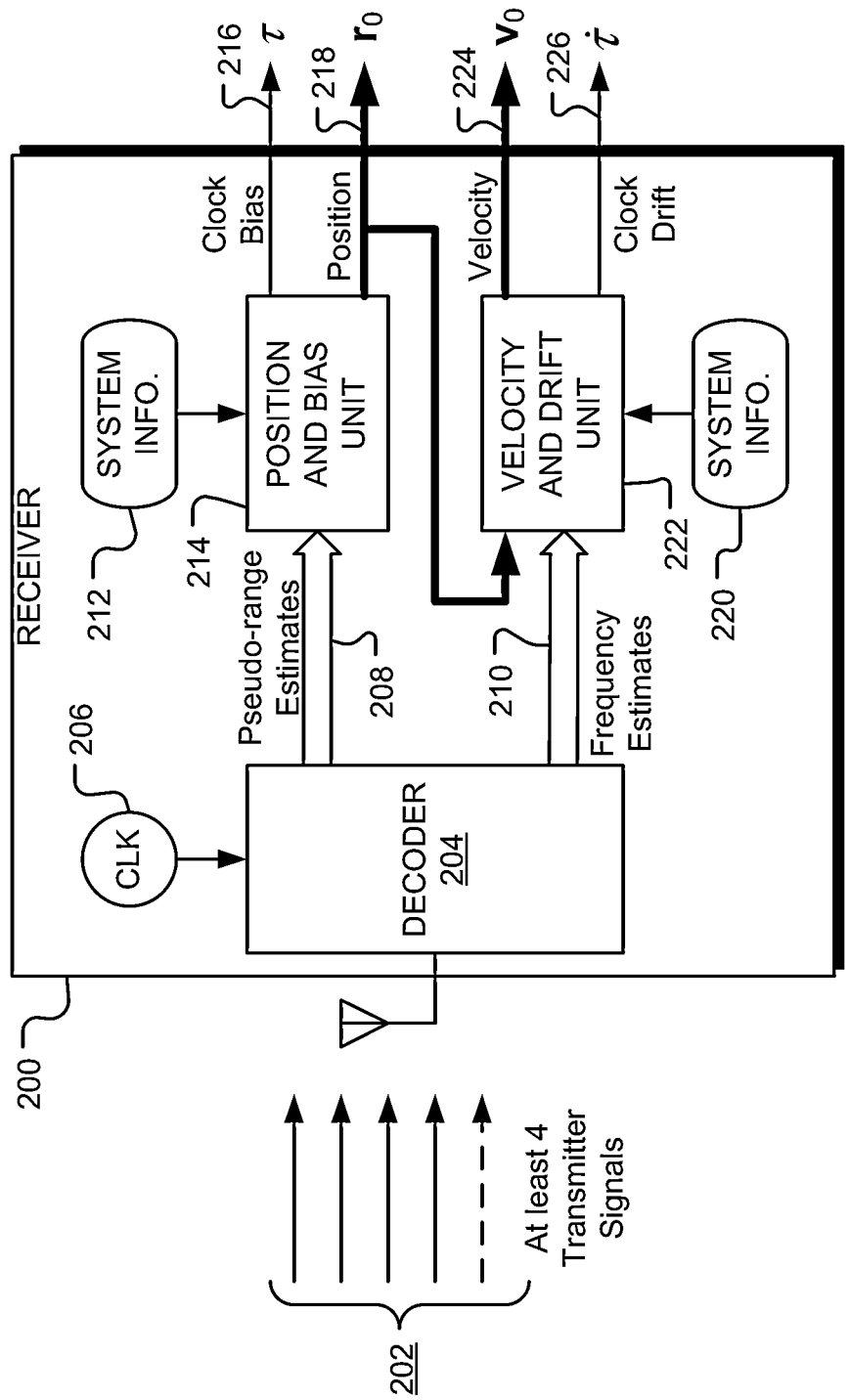
FIG. 2 is a block diagram of a navigation receiver that utilizes at least four transmitter signals.

FIG. 2 is a block diagram of a navigation receiver 200 that utilizes at least four transmitter signals 202. The signals, having been sensed by an antenna, dish or other suitable apparatus, are decoded in decoder 204. Using a signal from receiver clock 206, decoder 204 determines pseudo-ranges 208 to the transmitters and the estimated frequencies 210 present in the transmitted signals 202. The pseudo-ranges are estimates of the actual range that are made using the receiver clocks, which are not synchronized to the transmitter or system clocks.

The pseudo-range measurements 208, together with system information 212, such as transmitter positions, from local or remote source, are used in position and bias unit 214 to estimate the bias or offset T (216) of clock 206 relative to the transmitter clocks and also to estimate the position vector $r_0$ (218) of the receiver. The system information 212 may be obtained via a navigational message. The frequency estimates 210, together with transmitter information, such as transmitter velocities, from local or remote source 220, are used in velocity and drift unit 222 to estimate the velocity vector $v_0$ (224) of the receiver and also to estimate the drift $\dot{\tau}$ (226) of clock compared to the transmitter clocks.

Thus, receiver 200 provides the position vector $r_0$ (218) of the receiver and the velocity vector $v_0$ (224) of the receiver.

In addition, the (transmitter) time is available by compensating for the offset and drift of clock 206 using 216 and 226.

By way of explanation, the relationship between the pseudo-ranges and estimated frequencies and position, velocity and time are described below.

Position and Clock Bias

The geometric distance from a transmitter at position vector r to a receiver at position vector $r_0$ is denoted as $r_i=|r_0-r_i|$. This corresponds to the length of the vector 116 shown in FIG. 1. This may be obtained, for example, by measuring misalignment between a reference signal and a signal transmitted at time $t_i$ from the $i^{th}$ transmitter and received at time to at the receiver. In the simplest model, $$r_i(r_0)=|r_0-r_i|=c(t_0-t_i), \quad (1)$$

where c is the speed of propagation of the signal from the receiver. More sophisticated models may be used that consider varying propagation speeds in the propagation path. However, time is measured using the receiver clock that indicates the time to be $$\tilde{t}_0=t_0+\tau_0, \quad (2)$$

Herein, the superposed tilde (~) is used to denote a measured value. $\tau_0$ is a receiver clock bias or offset from a reference or system time at the time of the measurement. The initial estimate of the distance from transmitter i, referred to as the pseudo-range, is measured as $$\tilde{\rho}_i=c(\tilde{t}_0-t_i)=c(t_0+\tau_0-t_i)=c(t_0-t_i)+c\tau_0=r_i+c\tau_0, \quad (3)$$

Defining a function $F_i$ for the $i^{th}$ transmitter as $$F_i(r, \tau; \tilde{\rho}_i) \triangleq |r-r_i|+c\tau-\tilde{\rho}_i, \quad (1)$$

equation (3) can be written as $$F_i(r_0,\tau_0;\tilde{\rho}_i)=0, \quad (2)$$

in which the subscript i denotes a dependence of the transmitter properties $t_i$ and $r_i$. This equation is referred to as a 'ranging' equation.

Doppler Shift, Velocity and Clock Drift

When transmitter i is moving with velocity vector $v_i \ll c$ and is emitting a signal with frequency $f_T^i$, and the receiver is moving with velocity vector $v_0 \ll c$ the relative velocity is $$\delta v_i = \frac{1}{r_i}(r_0-r_i)\cdot(v_i-v_0), \quad (3)$$

where $$\frac{1}{r_i}(r_0-r_i)$$

is a unit vector in the direction from transmitter i to the receiver.

The frequency shift observed at the receiver is $$f_0^i - f_T^i = \frac{\delta v_i}{c} f_T^i = \frac{f_T^i}{c r_i}(r_0-r_i)\cdot(v_i-v_0) \quad (7)$$

which can be rearranged as $$(r_0-r_i)\cdot(v_i-v_0) = \frac{c(f_0^i - f_T^i)}{f_T^i} r_i \quad (8)$$

The frequency, or rate of change of phase, is measured with an imperfect clock that measures time $t_0$, so we have $$f_0^i = \frac{1}{2\pi} \frac{d\phi_i}{dt} = \frac{1}{2\pi} \frac{d\phi_i}{dt} \cdot \frac{dt_0}{dt} = \tilde{f}_0^i (1 + \dot{\tau}) \qquad (9)$$

In the prior art, the direction vector $$a_i = \frac{r_0 - r_i}{|r_0 - r_i|} = \frac{r_0 - r_i}{r_i}$$

is assumed to be known. In which case, substituting for $f_0$ in terms of the measured frequency gives $$a_i \cdot (v_i - v_0) = c \frac{\tilde{f}_0^i (1 + \dot{\tau}_0) - f_T^i}{f_T^i}, \qquad (10)$$

which can be rearranged as $$\begin{bmatrix} a_i^T & c \frac{\tilde{f}_0^i}{f_T^i} \end{bmatrix} \begin{bmatrix} v_0 \\ \dot{\tau}_0 \end{bmatrix} = a_i \cdot v_i - c \frac{\tilde{f}_0^i - f_T^i}{f_T^i}. \qquad (11)$$

Equations for four transmitters gives a set of four linear equations for four unknown values, which can be solved by techniques, such as Gauss-Jordan elimination.

However, when fewer than four transmitters are available, the direction vector a is not known since it depends upon the unknown position $r_0$. Substituting for both $f_0$ and $r_i$ in terms of the measured frequency and pseudo-range in equation (8) gives.

$$(r_0 - r_i) \cdot (v_i - v_0) = c \frac{\tilde{f}_0^i (1 + \dot{\tau}_0) - f_T^i}{f_T^i} (\tilde{p}_i - c\tau_0). \qquad (12)$$

In this equation the unknowns are $r_0$, $v_0$, $\dot{\tau}_0$. Finally, defining a function $G_i$ for the $i^{th}$ transmitter as $$G_i(r, \tau, \dot{\tau}, v; \tilde{p}_i, \tilde{f}_0^i) \triangleq (r - r_i) \cdot (v_i - v) - c \frac{\tilde{f}_0^i (1 + \dot{\tau}) - f_T^i}{f_T^i} (\tilde{p}_i - c\tau), \qquad (4)$$

equation (12) becomes $$G_i(r_0, \tau_0, \dot{\tau}_0, v_0; \tilde{p}_i, \tilde{f}_0^i) = 0.$$

Equation (5) is referred to as the ranging equation for transmitter i, while equation (14) is referred to as the Doppler equation. Again, it is noted that in equation (14) the measured quantities are the pseudo-range and frequency $\tilde{p}_i$, $\tilde{f}_0^i$ while the values of $r_0$, $\tau_0$, $\dot{\tau}_0$, $v_0$ are all unknown.

Position Velocity and Time using Four or more Transmitters

In FIG. 2, the signals 202 from four transmitters are decoded in decoder 204 to provide pseudo-ranges [|$] $~$$[|$]$~ A\tilde{T}[|$]$~\tilde{gr}_1, \tilde{p}_2, \tilde{p}_3, \tilde{p}_4$ (208). Position and bias unit 214 uses these estimates to determine position and clock bias estimates 218 and 216. The range estimates are used to give a set of four non-linear equations in four unknowns, namely $$\begin{rcases} F_1(r_0, \tau_0; \tilde{p}_1) = 0 \\ F_2(r_0, \tau_0; \tilde{p}_2) = 0 \\ F_3(r_0, \tau_0; \tilde{p}_3) = 0 \\ F_4(r_0, \tau_0; \tilde{p}_4) = 0 \end{rcases} \qquad (15)$$

These equations are solved in unit 214 to give estimates for $r_0$, $\tau_0$.

Once position vector $r_0$ is computed, it is used in velocity and drift unit 222 to determine velocity 224 and clock drift 226. The Doppler equation from the four transmitter signals are used to give four equations $$\begin{rcases} G_1(r_0, \tau_0, \dot{\tau}_0, v_0; r_1, \tilde{f}_0^1) = 0 \\ G_2(r_0, \tau_0, \dot{\tau}_0, v_0; r_2, \tilde{f}_0^2) = 0 \\ G_3(r_0, \tau_0, \dot{\tau}_0, v_0; r_3, \tilde{f}_0^3) = 0 \\ G_4(r_0, \tau_0, \dot{\tau}_0, v_0; r_4, \tilde{f}_0^4) = 0 \end{rcases} \qquad (16)$$

which may be solved for $\dot{\tau}_0$, $v_0$. Note that the corrected ranges $r_i=|r_0-r_i|$, output from unit 214, are used in the above equations, rather than the pseudo-ranges. Thus, (a) a minimum of four transmitters are required and (b) the receiver position is found from pseudo-range measurements alone, using (15). The velocity is found from the Doppler measurements using (16).

In accordance with an embodiment of the disclosure, the ranging and Doppler equations for four or more transmitters are combined and solved together. For four transmitters, for example, the measurements provide a set of 8 equations $$\begin{rcases} F_1(r_0, \tau_0; \tilde{p}_1) = 0 \\ F_2(r_0, \tau_0; \tilde{p}_2) = 0 \\ F_3(r_0, \tau_0; \tilde{p}_3) = 0 \\ F_4(r_0, \tau_0; \tilde{p}_4) = 0 \\ G_1(r_0, \tau_0, \dot{\tau}_0, v_0; \tilde{p}_1, \tilde{f}_0^1) = 0 \\ G_2(r_0, \tau_0, \dot{\tau}_0, v_0; \tilde{p}_2, \tilde{f}_0^2) = 0 \\ G_3(r_0, \tau_0, \dot{\tau}_0, v_0; \tilde{p}_3, \tilde{f}_0^3) = 0 \\ G_4(r_0, \tau_0, \dot{\tau}_0, v_0; \tilde{p}_4, \tilde{f}_0^4) = 0 \end{rcases} \qquad (17)$$

Thus, given measurements $\tilde{p}_1, \tilde{p}_2, \tilde{p}_3, \tilde{p}_4, \tilde{p}_1, \tilde{f}_0^1, \tilde{f}_0^2, \tilde{f}_0^3, \tilde{f}_0^4$, the equations above can be used to determine $r_0$, $\tau_0$, $\dot{\tau}_0$, $v_0$. It is noted that there are six unknown values, so the equations may still be solved even if two of the transmitters are stationary.

Position and Time using Three Transmitters

Figure 3:
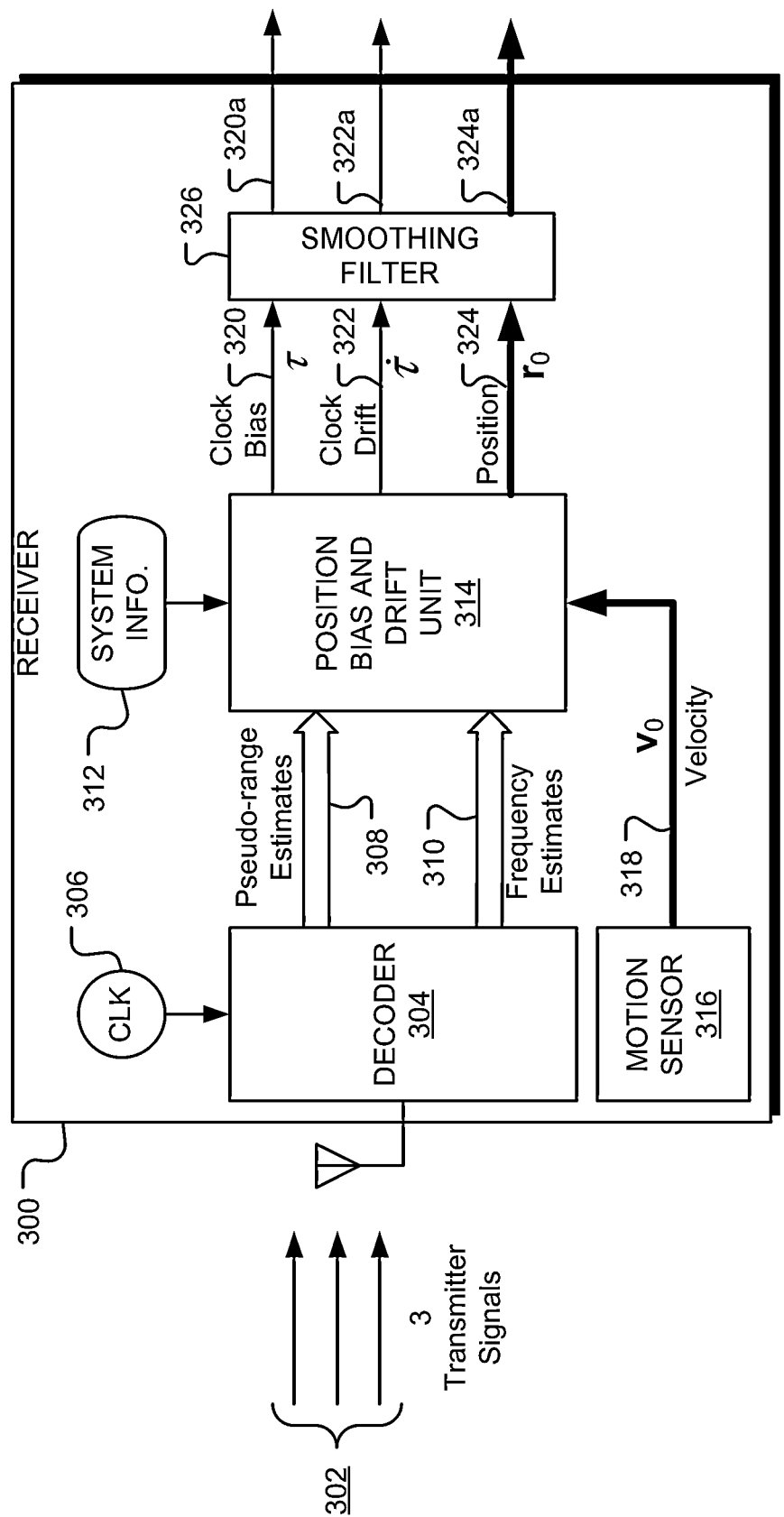
FIG. 3 is a block diagram of a navigation receiver, in accordance with a representative embodiment of the disclosure.

In accordance with an embodiment of the disclosure, pseudo-range and Doppler measurements from only three transmitters are used to determine position, clock bias and clock drift. FIG. 3 is a block diagram of a navigation receiver 300 in accordance with certain embodiments of the disclosure. Navigation receiver 300 uses only three transmitter signals 302. The signals, having been sensed by an antenna, dish or other means, are decoded in decoder 304. Using a signal from receiver clock 306, decoder 304 determines pseudo-ranges 308 to the three transmitters and the measured frequencies 310 present in the transmitted signals 302.

The pseudo-range measurements 308 and frequency measurements 310, together with system information 312, such as transmitter positions, from local or remote source, are used in position, bias and drift unit 314. System information 312 may be received in a navigational message. Unit 314 also uses motion sensor 316 to determine the velocity vector $v_0$ 318 of the receiver. A variety of motion sensors, such as optical sensors, inertial navigation systems and combinations of accelerometers, gyroscopes and magnetometers, may be used for both ground-based and in-air devices. From these signals, unit 314 estimates the bias or offset r (320), the drift $\dot{\tau}_0$ (322) of the clock compared to the transmitter clocks, and position vector $r_0$ (324) of the receiver.

Thus, receiver 300 provides the position vector $r_0$ (324) of the receiver. In addition, the (transmitter) time is available by compensating for the offset and drift of clock 306 using estimates 320 and 322.

Optionally, the position vector $r_0$ (324), clock bias $\tau$ (320), the clock drift TO (322) are input to smoothing filter 326 to provide improved estimates 324a, 320a and 322a, respectively. Smoothing filter 326 may be a Kalman filter or other suitable smoothing filter.

Smoothing filter 326 may be implemented within the receiver, as shown, or outside of the receiver as a separate element. In one embodiment, a processor is used to implement both unit 314 and smoothing filter 326.

Signals from the three transmitters, at least two of which are moving relative to the receiver, are used to provide a set of six equations $$\left.\begin{array}{l} F_1(r_0, \tau_0; \tilde{\rho}_1) = 0 \\ F_2(r_0, \tau_0; \tilde{\rho}_2) = 0 \\ F_3(r_0, \tau_0; \tilde{\rho}_3) = 0 \\ G_1(r_0, \tau_0, \dot{\tau}_0, v_0; \tilde{\rho}_1, \tilde{f}_0^1) = 0 \\ G_2(r_0, \tau_0, \dot{\tau}_0, v_0; \tilde{\rho}_2, \tilde{f}_0^2) = 0 \\ G_3(r_0, \tau_0, \dot{\tau}_0, v_0; \tilde{\rho}_3, \tilde{f}_0^3) = 0 \end{array}\right\} \quad (18)$$

Thus, given measurements $\tilde{\rho}_1$, $\tilde{\rho}_2$, $\tilde{\rho}_3$, $\tilde{f}_0^1$, $\tilde{f}_0^2$, $\tilde{f}_0^3$ and receiver velocity $v_0$, the equations above can be used to determine $r_0$, $\tau_0$, $\dot{\tau}_0$. The equations are solved together. It is noted that, unlike previous approaches, the functions $G_i$ are dependent upon the pseudo-range measurements $\rho_i$. These equations are solved for the five unknown values $r_0$, $\tau_0$, $\dot{\tau}_0$ when the velocity $v_0$ of the receiver is known. In contrast to prior techniques, the pseudo-range and Doppler measurements are used together in unit 314. Thus, the unknown receiver position is determined dependent upon the measured frequencies.

One embodiment of the present disclosure relates to a method for determining a position of a receiver moving with a known velocity. For each of three transmitters, a pseudo-range to the transmitter is determined from a transmitted signal, using a receiver clock, where the receiver clock has an unknown clock bias and an unknown clock drift. The position $r_i$ of the transmitter, the velocity $v_0$ of the receiver and the pseudo-range $\tilde{\rho}_i$, which are known, are related to the position of the receiver $r_0$ and the clock bias $\delta\tau$, which are unknown, through a first relationship, given in equation (5). For each of at least two of the three transmitters, a frequency $\tilde{f}_0^i$ of the transmitted signal is measured using the receiver clock. The position of the transmitter, the velocity of the transmitter, the velocity of the receiver, the pseudo-range and the measured frequency, which are known, are related to the position of the receiver, the clock bias, and the clock drift, which are unknown, through a second relationship, given by equation (14). The position of the receiver is found from the first relationships for the three transmitters and second relationships for the at least two transmitters in combination, as given in equation (18).

In one embodiment, the relationships above are linearized about a current estimate to provide linearized relationships, as discussed below.

The clock bias, and the clock drift may also be determined from the first relationships for the three transmitters and second relationships for the at least two transmitters.

The navigation receiver in FIG. 3 is a system for determining a position of a receiver. The system includes motion sensor 316 configured to measure a velocity of the receiver. Alternatively, the receiver velocity may be known by some other technique. For example, the receiver may be stationary when its position is determined. The system also includes receiver clock 306, which has a clock bias and a clock drift relative to a reference clock, and decoder 304. The decoder is configured to receive transmitted signals from a number of transmitters and determine pseudo-ranges and transmitter frequencies therefrom. The system also includes unit 314, which is a processing unit configured to receive the pseudo-ranges 308, the transmitter frequencies 310 and the measured receiver velocity 318 and determine the position of the receiver therefrom.

Unit 314 utilizes system information 312, such as known locations and velocities of the transmitters.

Position and Time from Two Transmitters

Figure 4:
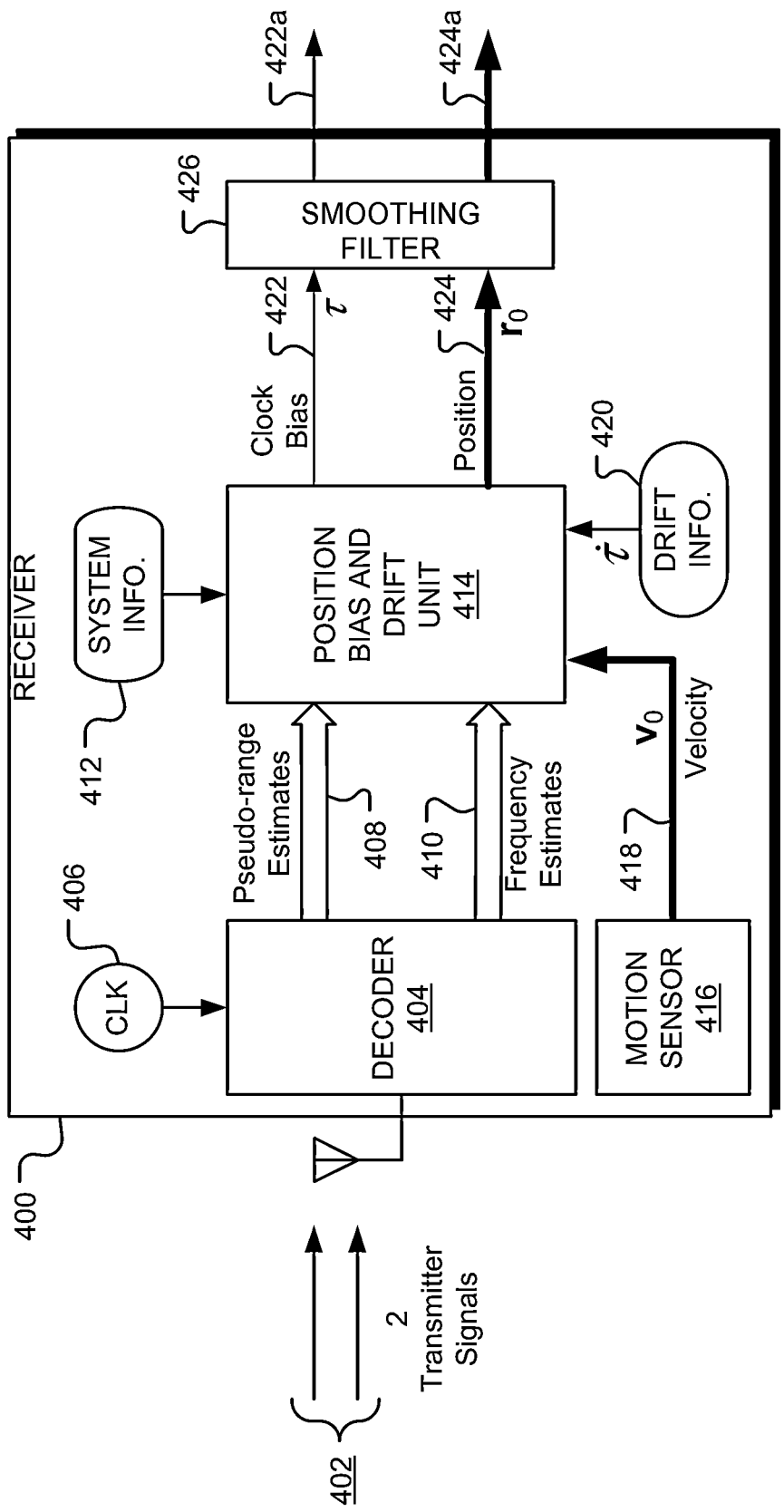
FIG. 4 is a block diagram of a navigation receiver, in accordance with a further representative embodiment of the disclosure.

In accordance with another embodiment of the disclosure, signals from only two transmitters are used to provide a set of four equations. FIG. 4 is a block diagram of a navigation receiver 400 in accordance with certain embodiments of the disclosure. Navigation receiver 400 uses only two transmitter signals 402. The signals, having been sensed by an antenna, dish or other technique and/or apparatus, are decoded in decoder 404. Using a signal from receiver clock 406, decoder 404 determines pseudo-ranges 408 to the two transmitters and the measured frequencies 410 present in the transmitted signals 402.

The pseudo-range measurements 408 and frequency measurements 410, together with system information 412, such as transmitter positions, from local or remote source, are used in position, bias and drift unit 414. Unit 414 also uses motion sensor 416 to determine the velocity vector $v_0$ 418 of the receiver. Still further, unit 414 uses an estimated or known value 420 of the clock drift $\dot{\tau}_0$. From these signals, unit 414 estimates the bias or offset T (422) of the clock compared to the transmitter clocks in addition to position vector $r_0$ (424) of the receiver.

Optionally, the position vector $r_0$ (424) and clock bias $\tau$ (422) are input to smoothing filter 426 to provide improved estimates 424a and 422a, respectively. Smoothing filter 426 may be a Kalman filter or other smoothing filter. Smoothing filter 426 may be implemented within the receiver, as shown, or outside of the receiver as a separate element. In one embodiment, a processor is used to implement both unit 414 and smoothing filter 426.

Various methods for estimating or eliminating the clock drift will be apparent to those of ordinary skill in the art. In one embodiment, a clock with very low drift, such as a battery-powered, chip-scale atomic clock (CSAC) is used. While a bias error may still be present, the error in the frequency measurement due to clock drift $\dot{\tau}_0$ is negligible. The U.S. Defense Advanced Research Projects Agency (DARPA) has programs underway to develop an Atomic Clock with Enhanced Stability (ACES). ACES will provide next-generation, battery-powered chip-scale atomic clocks with drifts that are orders of magnitude less than clocks currently used in navigation. In a further embodiment, the drift of the clock is modeled. The model may be updated, for example, during a period of time when three or more transmitters are available.

In one embodiment, a clock having a drift less than $10^{-10}$ sec/sec is used. In a further embodiment, a clock having a drift less than $10^{-11}$ sec/sec is used. In a still further embodiment a clock having a drift less than $10^{-12}$ sec/sec is used. For purposes of this specification, a very low drift refers to a clock having a draft less than approximately 10-1 sec/sec.

Various embodiments allow for different clock drift rates by using clocks with different oscillators such as oven-controlled crystal oscillators (OCXO) or temperature-compensated crystal oscillators (TCXO). In one embodiment, a clock with an OCXO may be used instead of a clock with an unmodified crystal oscillator to enable lower clock drift.

In one embodiment, the clock drift is modeled, such that the clock drift is known to an accuracy better than $10^{-10}$ sec/sec. In a further embodiment, the clock drift is modeled, such that the clock drift is known to an accuracy better than $10^{-11}$ sec/sec. In a still further embodiment, the clock drift is modeled, such that the clock drift is known to an accuracy better than $10^{-12}$ sec/sec. The clock may be modeled as having zero drift.

Unit 414 outputs the position vector $r_0$ (424) of the receiver. In addition, the (transmitter) time is available by compensating for the offset clock 406 using bias estimate 422 and drift 420.

The ranging and Doppler equations for the two moving transmitters give four equations in four unknowns.

$$\left. \begin{array}{l} F_1(r_0, \tau_0; \vec{p}_1) = 0 \\ F_2(r_0, \tau_0; \vec{p}_2) = 0 \\ G_1(r_0, \tau_0, \dot{r}_0, v_0; \vec{p}_1, \vec{f}_0^1) = 0 \\ G_2(r_0, \tau_0, \dot{r}_0, v_0; \vec{p}_2, \vec{f}_0^2) = 0 \end{array} \right\} \quad (19)$$

Thus, given measurements $\tilde{\rho}_1, \tilde{\rho}_2, \tilde{f}_0^1, \tilde{f}_0^2$, receiver velocity $v_0$, and clock drift $\dot{\tau}_0$, the equations above can be used to determine $r_0, \tau_0$. These equations are solved in unit 414 for the four unknown values $r_0, \tau_0$ when the both the velocity $v_0$ of the receiver and the clock drift to are known.

The equations described above are sets of non-linear equations. Units 314 and 414 include processors that may be configured, in software, hardware or a combination thereof, to solve the equations using any of a number of numerical techniques, non-linear solvers (such as the Levenberg-Marquardt algorithm) and search techniques (such as gradient decent algorithm). An example of an approach in which the equations are linearized around an approximate solution is described below. Also, the equations may form the basis for a recursive estimator, such as an extended Kalman filter.

The estimated position, clock bias and clock drift may be provided to a smoothing or tracking filter, such as a Kalman smoother, dynamic data reconciliation (DDR) filter, non-linear Bayesian filter, etc., to improve the estimates. The smoothing filter may utilize dynamic and statistical models to obtain improved estimates of the position, clock bias and/or clock drift.

An embodiment of the present disclosure is a method for determining a position of a receiver moving with a known velocity. For each of two transmitters, a pseudo-range to the transmitter is determined from a transmitted signal using a receiver clock. The receiver clock having an unknown clock bias and a known clock drift. The position r of the transmitter, the velocity $v_0$ of the receiver and the pseudo-range $\tilde{\tau}_i$, which are known, are related to the position $r_0$ of the receiver and the clock bias $\delta_\tau$, which are unknown, through a first relationship, given in equation (5) above. For each of the two transmitters, a frequency $\tilde{f}_0^i$ of the transmitted signal is measured using the receiver clock. The position of the transmitter, the velocity of the transmitter, the velocity of the receiver, the pseudo-range, the measured frequency and the clock drift, which are known, are related to the position of the receiver and the clock bias, which are unknown, through a second relationship, given in equation (14) above. The position $r_0$ of the receiver is determined from the first relationships for the two transmitters and the two second relationships for the two transmitters in combination, as given in equation (19) above. The clock bias $\delta\tau$ may also be determined.

The navigation receiver in FIG. 4 is a system for determining a position of a receiver. The system includes motion sensor 416 configured to measure a velocity of the receiver. Alternatively, the receiver velocity may be known by some other technique and/or apparatus. For example, the receiver may be stationary when its position is determined. The system also includes receiver clock 406, which has a clock bias and a clock drift relative to a reference clock, and decoder 404. The decoder is configured to receive transmitted signals from a number of transmitters and determine pseudo-ranges and transmitter frequencies therefrom. The system also includes unit 414, which is a processing unit configured to receive the pseudo-ranges 408, the transmitter frequencies 410 and the measured receiver velocity 418 and determine the position of the receiver therefrom. When only two transmitters are available, the position of the receiver may be determined dependent upon a known receiver clock drift 420. A clock with very low drift may be used, so that clock drift is negligible in the equations. Unit 414 may also determine the receiver clock bias.

Unit 414 utilizes system information 412, such as known locations and velocities of the transmitters.

Example Solution Method: Linearization

The ranging equations are considered first. The unknown values $r_0, \tau_0$ may be written as the sum of estimated values $\hat{r}, \hat{\tau}$ and changes $\delta r, \delta \tau$, so that $r_0 = \hat{r} + \delta r$, $\tau_0 = \hat{\tau} + \delta \tau$. The equations are linearized around the estimated values using a Taylor expansion to give $$F_i(\hat{r} + \delta r, \hat{\tau} + \delta\tau) \Box F_i(\hat{r}, \hat{\tau}) + \nabla_{\hat{r}} F_i|_{\hat{r},\hat{\tau}} \cdot \delta r + \left.\frac{\partial F_i(r, \tau; \tilde{p}_i)}{\partial \tau}\right|_{\hat{r},\hat{\tau}} \delta\tau \quad (20)$$

Herein, the superposed caret (A) is used to denote an estimated value. Using $$\nabla_r F_i(r, \tau; \tilde{p}_i) = \frac{r - r_i}{|r - r_i|} = u_i \quad (21)$$

$$\frac{\partial F_i(r, \tau; \tilde{p}_i)}{\partial \tau} = c$$

and setting to zero gives $$\hat{u}_i^T + c\delta\tau = -F_i(\hat{r}, \hat{\tau}, \tilde{\rho}) \quad (22)$$

This equation has four unknown values. Similarly, when the velocity $v_0$ of the receiver is known, $$G_i(\hat{r} + \delta r, \hat{\tau} + \delta t, \hat{\dot{\tau}} + \delta\dot\tau, v_0; \tilde{p}_i, \tilde{f}_0^j) \approx G_i + \nabla_r G_i \cdot \delta r + \frac{\partial G_i}{\partial \tau}\delta\tau + \frac{\partial G_i}{\partial \dot t}\delta\dot t, \quad (23)$$

where all the terms on the right hand side of the equation. are evaluated at $\hat{r}$, $\hat{\tau}$, $\hat{\dot{\tau}}$, $v_0$; $\tilde{\rho}_i$, $\tilde{f}_0$. Using $$\nabla_r G_i = v_i - v \tag{24}$$

$$\frac{\partial G_i}{\partial \tau} = c^2 \frac{\tilde{f}_0^i(1+\hat{\dot{\tau}}) - f_T^i}{f_T^i}$$

$$\frac{\partial G_i}{\partial \dot{\tau}} = -c \frac{\tilde{f}_0^i}{f_T^i}(\tilde{\rho}_i - c\tau)$$

and setting to zero gives $$(v_i - v_0) \cdot \delta r + c^2 \frac{\tilde{f}_0^i(1+\hat{\dot{\tau}}) - f_T^i}{f_T^i} \delta \tau - c \frac{\tilde{f}_0^i}{f_T^i}(\tilde{\rho}_i - c\hat{\tau})\delta\dot{\tau} = \tag{25}$$

$$-G_i(\hat{r}, \hat{\tau}, \hat{\dot{\tau}}, v_0; \tilde{\rho}_i, \tilde{f}_0^i).$$

This can be written more compactly as $$a_i^T \delta r + b_i(\hat{\tau}, \hat{\dot{\tau}}) c \delta \tau + c_i(\hat{\tau}) c \delta \dot{\tau} = -G_i(\hat{r}, \hat{\tau}, \hat{\dot{\tau}}, v_0; \tilde{\rho}_i, \tilde{f}_0^i) \tag{26}$$

where $$a_i = v_i - v_0 \tag{27}$$

$$b_i(\hat{\tau}, \hat{\dot{\tau}}) = c \frac{\tilde{f}_0^i(1+\hat{\dot{\tau}}) - f_T^i}{f_T^i}$$

$$c_i(\hat{\tau}) = -\frac{\tilde{f}_0^i}{f_T^i}(\tilde{\rho}_i - c\hat{\tau})$$

This equation has the same four unknown values, plus an additional unknown value. However, when the clock drift $\dot{\tau}_0$ is known, the equation has the same four unknown values.

Combining Equations

When the receiver velocity is known, but the clock drift is unknown, measurements from three transmitters may be combined to give $$\begin{bmatrix} \hat{u}_1^T & 1 & 0 \\ \hat{u}_2^T & 1 & 0 \\ \hat{u}_3^T & 1 & 0 \\ a_1^T & b_1(\hat{\tau},\hat{\dot{\tau}}) & c_1(\hat{\tau}) \\ a_2^T & b_2(\hat{\tau},\hat{\dot{\tau}}) & c_2(\hat{\tau}) \\ a_3^T & b_3(\hat{\tau},\hat{\dot{\tau}}) & c_3(\hat{\tau}) \end{bmatrix} \begin{bmatrix} \delta r \\ c\delta\tau \\ c\delta\dot{\tau} \end{bmatrix} = - \begin{bmatrix} F_1(\hat{r},\hat{\tau};\tilde{\rho}_1) \\ F_2(\hat{r},\hat{\tau};\tilde{\rho}_2) \\ F_3(\hat{r},\hat{\tau};\tilde{\rho}_3) \\ G_1(\hat{r},\hat{\tau},\hat{\dot{\tau}}_0,v_0;\tilde{\rho}_1,\tilde{f}_0^1) \\ G_2(\hat{r},\hat{\tau},\hat{\dot{\tau}}_0,v_0;\tilde{\rho}_2,\tilde{f}_0^2) \\ G_3(\hat{r},\hat{\tau},\hat{\dot{\tau}}_0,v_0;\tilde{\rho}_3,\tilde{f}_0^3) \end{bmatrix} \tag{28}$$

This a set of 6 linear equations for 5 unknown parameters and may be solved by the method of least squares, for example. Alternatively, when one of the transmitters is stationary, the corresponding Doppler equation is not used, resulting in a set of five equations in five unknowns. Since the equations provide updates to estimated values, the equations may be used iteratively to provide increased accuracy.

When the clock drift to is also known, measurements from only two transmitters may be combined to give $$\begin{bmatrix} \hat{u}_1^T & 1 \\ \hat{u}_2^T & 1 \\ a_1^T & b_1(\hat{\tau},\hat{\dot{\tau}}) \\ a_2^T & b_2(\hat{\tau},\hat{\dot{\tau}}) \end{bmatrix} \begin{bmatrix} \delta r \\ c\delta\tau \end{bmatrix} = - \begin{bmatrix} F_1(\hat{r},\hat{\tau};\tilde{\rho}_1) \\ F_2(\hat{r},\hat{\tau};\tilde{\rho}_2) \\ G_1(\hat{r},\hat{\tau},\hat{\dot{\tau}}_0,v_0;\tilde{\rho}_1,\tilde{f}_0^1) \\ G_2(\hat{r},\hat{\tau},\hat{\dot{\tau}}_0,v_0;\tilde{\rho}_2,\tilde{f}_0^2) \end{bmatrix} \tag{29}$$

These equations may be solved by standard techniques such as elimination or QR decomposition. Again, since the equations provide updates to estimated values, the equations may be used iteratively to provide increased accuracy.

Hybrid System.

In one embodiment of the disclosure, the navigation receiver shown in FIG. 4, may be adaptively configured to operate in the same manner as the receivers shown in FIG. 2 and FIG. 3, dependent upon the number of transmitters available at a given time.

Figure 5:
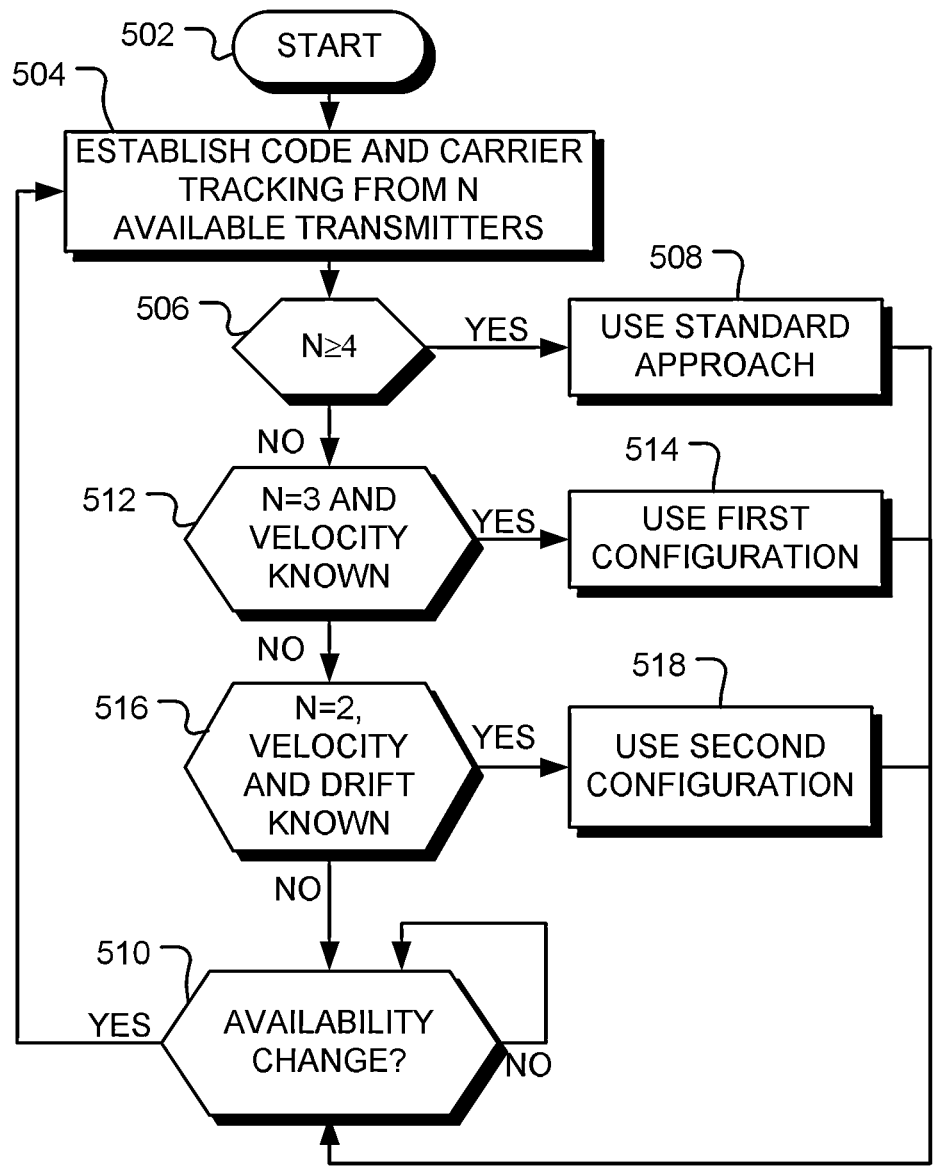
FIG. 5 is a flow chart of operation of a reconfigurable navigation receiver, in accordance with a representative embodiment of the disclosure.

FIG. 5 is a flow chart of a method 500 of operation of a reconfigurable navigation receiver in accordance with embodiments of the disclosure. Following the start of the method 502 in FIG. 5, the receiver establishes code and communication tracking from available transmitters 504. Once tracking is established, the pseudo-ranges and frequencies of the N available transmitters may be determined in the decoder of the receiver. When there are four or more transmitters available, i.e. N≥4, as depicted by the positive branch 506, the receiver may operate in the standard manner 508 and shown in FIG. 2. Alternatively, the standard approach may be augmented with any receiver velocity or clock drift information that is available. Flow continues to decision block 510, where the input signal is monitored to determine if the number of available transmitters has changed. While the number of available transmitters remains unchanged, the standard approach (with or without augmentation) continues to be used.

When the number of available transmitters is less than four, as depicted by the negative branch 506, flow continues to decision block 512. When the number of available transmitters is equal to three and receiver velocity information is available, as depicted by the positive branch from decision block 512, the receiver is configured and used as shown in FIG. 3, or its equivalent 514. This is referred to as the first configuration. The first configuration is used until, as depicted by the positive branch from decision block 510, a change in the number of available transmitters is detected.

When the number of available transmitters is less than three, or no receiver velocity information is available, as depicted by the negative branch from decision block 512, flow continues to decision block 516. When the number of available transmitters is equal to two and receiver velocity information is available, and the clock drift is known, as depicted by the positive branch from decision block 516, the receiver is configured and used as shown in FIG. 4, or its equivalent 518. This is referred to as the second configuration. The second configuration is used until, as depicted by the positive branch from decision block 510, a change in the number of available transmitters is detected.

When a change in the number of available transmitters is detected, as depicted by the positive branch from decision block 510, flow returns to block 504 and the process continues. In this manner, the navigation receiver adapts to the number of available transmitters and to the availability of additional information such as receiver velocity or clock drift.

An embodiment of the present disclosure relates to a method for determining a position of a receiver relative to a number of transmitters. A velocity of the receiver is sensed, using a motion sensor for example. The numbered of available transmitters is determined. Pseudo-ranges and frequencies of the available transmitters are measured using the receiver clock. When only two transmitters are available and a receiver clock drift is known, the position of the receiver is estimated from a combination of ranging equations for the two available transmitters and Doppler equations for the two available transmitters. The position is determined dependent upon the measured pseudo-ranges and frequencies, the sensed velocity of the receiver and the receiver clock drift. When three transmitters are available, the position of the receiver is estimated from a combination of ranging equations for the three available transmitters and Doppler equations for at least two of the three transmitters. The position is determined dependent upon the measured pseudo-ranges and frequencies and the sensed velocity of the receiver.

The receiver clock bias may also be determined when only two transmitters are available.

The receiver clock bias and the receiver clock drift may also be determined when three or more transmitters are available.

The adaptive navigational receiver provides a number of advantages over a standard receiver. A significant advantage being that the receiver can continue to operate using a reduced number of transmitters. In addition, when four or more transmitters are available, the performance is at least as good as a standard receiver and may be improved by the presence of additional information such as receiver velocity or clock drift.

In a further embodiment of the disclosure, a navigation system is provided that includes, at a given time, only three transmitters and a receiver as shown in FIG. 3, or its equivalent.

In a still further embodiment of the disclosure, a navigation system is provided that includes, at a given time, only two transmitters and a receiver as shown in FIG. 4, or its equivalent.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method for determining a location of a receiver having a known velocity, the method comprising:
   for each of three transmitters:
      receiving a measured pseudo-range from the receiver to the transmitter, where the measured pseudo-range, a position of the transmitter, the velocity of the receiver, which are known, are related to the location of the receiver and a clock bias of a receiver clock, which are unknown, through a first relationship;
   for each of at least two transmitters of the three transmitters:
      receiving a measured frequency of a signal transmitted from the transmitter, where the measured frequency, the position of the transmitter, the velocity of the transmitter, the velocity of the receiver and the measured pseudo-range, which are known, are related to the position of the receiver, the clock bias, and a clock drift of the receiver clock, which are unknown, through a second relationship; and
   determining the position of the receiver from each of the first relationships for the three transmitters and each of the second relationships for the at least two transmitters.

2. A non-transient, computer readable medium containing processing instructions that, when executed on one or more processors, perform the method of claim 1.

3. The method of claim 1, further comprising measuring the velocity of the receiver.

4. The method of claim 1, further comprising:
   generating, by the receiver clock, a timing signal from oscillations of a crystal or a chip-scale atomic clock; and
   for each of the three transmitters:
      determining the measured pseudo-range dependent upon the timing signal, a time encoded in a signal transmitted from the transmitter and a propagation model.

5. The method of claim 1, further comprising:
   generating, by the receiver clock, a timing signal from oscillations of a crystal; and
   for each of the at least two transmitters, determining the measured frequency dependent upon the time signaling.

6. The method of claim 1, where determining the position of the receiver from each of the first relationships for the three transmitters and each of the second relationships for the at least two transmitters comprises executing a program of instructions on one or more processors.

7. The method of claim 1, where determining the position of the receiver from each of the first relationships for the three transmitters and each of the second relationships for the at least two transmitters comprises executing a program of instructions on one or more processors is performed in hardware.

8. The method of claim 1, where the at least two transmitters are moving relative to the receiver.

9. A method for determining a location of a receiver having a known velocity, the method comprising:
   for each of two transmitters that are moving relative to the receiver:
      receiving a measured pseudo-range from the receiver to the transmitter, where the measured pseudo-range, a position of the transmitter, the velocity of the receiver, which are known, are related to the location of the receiver and a clock bias of a receiver clock, which are unknown, through a first relationship;
      receiving a measured frequency of a signal transmitted from the transmitter, where the measured frequency, the position of the transmitter, the velocity of the transmitter, the velocity of the receiver, a clock drift of the receiver clock and the measured pseudo-range, which are known, are related to the position of the receiver, the clock bias, and, which are unknown, through a second relationship; and
   determining the position of the receiver from each of the first relationships for the three transmitters and each of the second relationships for the at least two transmitters.

10. A non-transient, computer readable medium containing processing instructions that, when executed on one or more processors, perform the method of claim 9.

11. The method of claim 9, further comprising measuring the velocity of the receiver.

12. The method of claim 9, further comprising determining the clock drift of the receiver clock from a computer model of the receiver clock.

* * * * *